June 21, 1927.
A. NUTT
1,632,913
PROPELLER MOUNTING
Original Filed Feb. 18, 1924
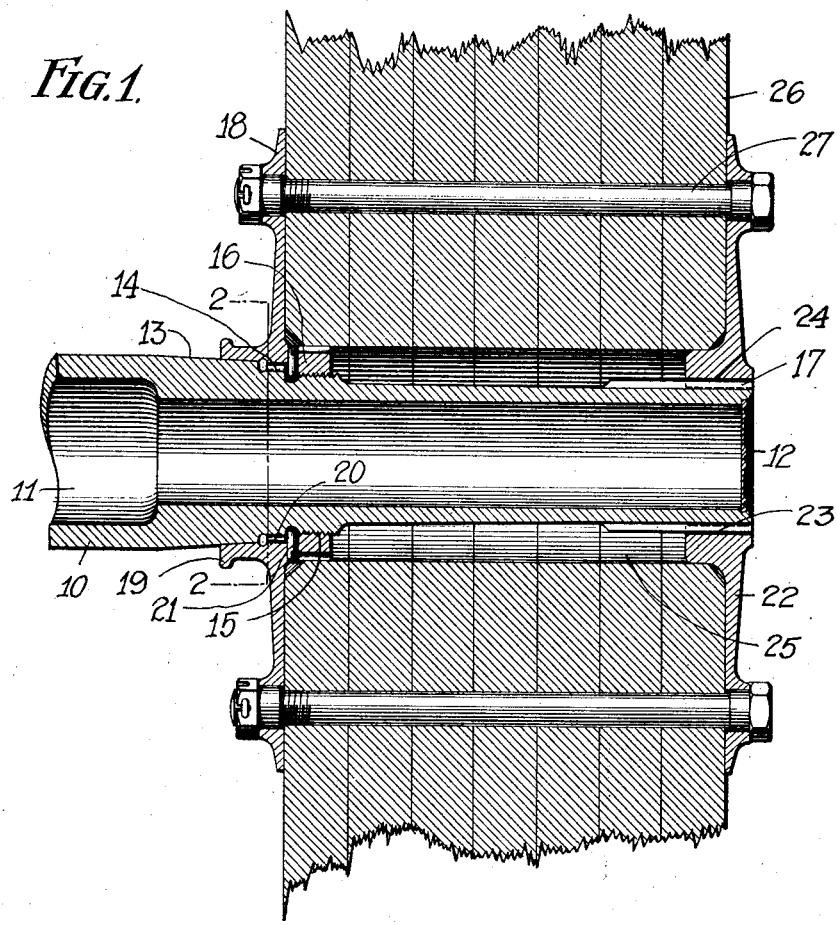
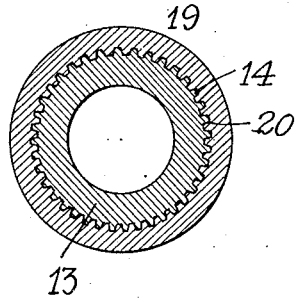
INVENTOR
ARTHUR NUTT.
BY
ATTORNEY.

Patented June 21, 1927.

1,632,913

UNITED STATES PATENT OFFICE.

ARTHUR NUTT, OF BUFFALO, NEW YORK, ASSIGNOR TO CURTISS AEROPLANE AND MOTOR COMPANY, INC., OF GARDEN CITY, LONG ISLAND, NEW YORK, A CORPORATION OF NEW YORK.

PROPELLER MOUNTING.

Application filed February 18, 1924, Serial No. 693,472. Renewed February 14, 1927.

My invention relates to propeller mountings and is concerned more particularly with propeller mountings in which maximum strength for minimum weight is fundamental to the design.

Heretofore, propeller mountings, and especially aeronautical propeller mountings, have embodied as a feature of design the use of a sleeve or cylindrical portion encircling and keyed or otherwise fastened to the stub end of the propeller drive shaft. Usually such sleeve or cylindrical portion is made integral with the inside face plate of the propeller hub, is extended thru the center bore of the propeller, and at its opposite end is so formed as to admit of its passage thru the outer face plate too. Upon its extended end, or at least directly associated with it, some sort of a fastening, such for instance, as a lock-nut, is used.

The present invention, as distinguished from the practice heretofore, eliminates the use of the above referred to metal cylindrical portion or sleeve. Instead of keying or otherwise fastening the sleeve to the drive shaft, the inner face plate of the propeller hub is provided with a direct spline connection to the drive shaft and is held thereon against axial displacement by a suitable fastening wholly enclosed in the center bore or opening of the propeller hub. At its outer end the outside face plate is likewise fastened, not to the sleeve or cylindrical portion which is omitted, but directly to the outer drive shaft end. Thus organized the driving torque is evenly applied to both face plates and consequently evenly distributed throughout the propeller hub, the weight of the mounting as a whole is reduced approximately forty percent; the construction simplified; and the fastening against axial movement of the propeller wholly enclosed within the opening of the propeller hub.

In the drawings, wherein like reference characters denote like or corresponding parts—

Fig. 1 is a transverse vertical sectional view of the hub portion of the propeller, the propeller hub, and the stub terminal of the propeller driving shaft, and Fig. 2 is a section on the line 2—2 of Fig. 1.

In the embodiment of the invention selected for illustration, 10 designates the propeller drive shaft which, in an aeronautical motor, is usually hollowed out as at 11, the outer shaft end being plugged as indicated at 12. Preferably said outer shaft end is tapered as at 13, such taper, in the embodiment illustrated being formed at a point inwardly removed from said outer end. Immediately adjacent the tapered portion of the drive shaft terminal spline teeth 14 are provided, and immediately adjacent such teeth, the stub terminal is further provided with threads 15 with which a lock-nut 16 is adapted to engage. From the threaded portion outwardly the shaft stub is reduced in diameter and at its extreme outer end is provided with spline teeth 17.

Upon the tapered portion 13 of the shaft stub the inner face plate 18 of the propeller hub is adapted to engage, said face plate 18 being provided with an inwardly directed annular flange 19, that the bearing surface between said face plate and the tapered portion of the shaft stub may be enlarged. In addition to flange 19, the face plate, in axial alignment with said flange, is provided with spline teeth 20 which are adapted to engage with the correspondingly formed teeth 14 of the shaft stub. Such engagement provides a direct driving connection between the inner face plate 18 and the propeller drive shaft. If desired, lock-pins 21 may be provided to jointly engage the face plate 18 and the lock-nut 16 to prevent a reverse rotation of the latter.

The forward or outer face plate 22, like the inner face plate 18, is flanged as at 23 and provided with spline teeth 24 which engage with the spline teeth 17 formed on the outer shaft end. This engagement establishes at the outer shaft end a direct driving connection between the shaft 10 and the outer face plate 22. In order that the shaft 10 may accommodate propeller hubs of varying thickness, the spline 17 formed on the outer shaft end may be extended inwardly to a point distantly removed from said outer end. Preferably, the flange 23 formed on the outer face plate 22 extends into the center bore 25 of the propeller 26 a sufficient distance to afford a bearing surface at the outer end of said bore. Such an arrangement is conducive to a better fit.

It will be seen from the above, when taken in connection with the accompanying drawing, that the heretofore universally used sleeve or cylindrical portion is omitted. It will be further seen that a two point direct driving connection between the drive shaft and the propeller hub is established, an inner point of driving contact being formed by the direct engagement of the inner face plate 18 with the driving section of the shaft and the outer point formed by the direct engagement of the outer face plate 22 with the splines 17 formed on the outer end of the shaft. Bolts 27, arranged radially about the propeller axis clamp the two face plates together. Preferably, said bolts 27 penetrate not only the hub section of the propeller but the two face plates as well. Moreover, by threading the drive shaft in the vicinity of its inwardly disposed driving section, the propeller hub fastening, heretofore invariably provided at the outer shaft end, is inwardly removed and entirely enclosed within the center bore of the propeller hub. A reduction in the total weight of the propeller mounting, i. e., a reduction of approximately forty percent, together with the two point direct driving connection between the opposed face plates and the propeller shaft constitute those features of improved propeller hub design which I consider most important.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a propeller mounting, a propeller shaft, a propeller having a center bore formed therein thru which one end of the propeller shaft is adapted to extend, an inner and an outer face plate mounted on said shaft and between which the propeller is clamped, means enclosed within the center bore of the propeller to fasten the inner plate on said shaft, and bolts carried thru the propeller from one to the other of said face plates to secure the outer face plates on said shaft, said bolts constituting the sole means of holding said outer face plate in place.

2. In a propeller mounting, a propeller shaft tapered throughout a portion of its length and exteriorly threaded throughout a different portion of its length, said tapered portion and said threaded portion being formed upon said shaft at a point inwardly removed from its outer end, spline teeth formed upon said shaft between said threaded portion and said tapered portion, an inner face plate mounted on said shaft, an inwardly directed annular flange formed upon said inner face plate, spline teeth likewise formed upon said inner face plate, said flange portion of said inner face plate being adapted to engage the tapered portion of the propeller shaft and said spline teeth being adapted to engage with the spline teeth of said propeller shaft, a lock-nut mounted on the threaded portion of the propeller shaft to fasten said inner face plate on said shaft, an outer face plate, a spline connection between said outer face plate and said shaft, a propeller mounted between said face plates, said propeller having formed therein a center bore thru which the outer end of the propeller shaft is adapted to extend and within which said lock-nut is wholly enclosed, and propeller bolts carried by the propeller and extended from one to the other of the face plates, said propeller bolts constituting the sole means for fastening said outer face plate upon the propeller shaft.

In testimony whereof I hereunto affix my signature.

ARTHUR NUTT.